United States Patent
Uchiyama et al.

[11] Patent Number: 6,107,573
[45] Date of Patent: Aug. 22, 2000

[54] WATERTIGHT CONSTRUCTION FOR ENDS OF WIRES AND METHOD FOR FORMING THE WATERTIGHT CONSTRUCTION

[75] Inventors: Kenichi Uchiyama; Shigeto Kawamura, both of Yokkaichi, Japan

[73] Assignee: Sumitomo Wiring Systems, Ltd., Japan

[21] Appl. No.: 09/251,823

[22] Filed: Feb. 17, 1999

[30] Foreign Application Priority Data

Feb. 18, 1998 [JP] Japan .................................. 10-036473

[51] Int. Cl.$^7$ .................................................. H02G 15/02
[52] U.S. Cl. ......................................................... 174/75 R
[58] Field of Search ............................... 174/74 R, 74 A, 174/75 R, 76, 93; 439/578, 610

[56] References Cited

U.S. PATENT DOCUMENTS

| | | |
|---|---|---|
| 3,206,833 | 9/1965 | Yonkers . |
| 4,292,099 | 9/1981 | Dinger . |
| 5,536,183 | 7/1996 | Brandolf . |
| 5,641,943 | 6/1997 | Sawamura ............................ 174/74 A |
| 5,895,890 | 4/1999 | Uchiyama et al. ............... 174/74 R X |
| 5,901,441 | 5/1999 | Kawamura et al. .................. 174/76 X |
| 5,922,992 | 4/1999 | Kinney et al. ......................... 174/74 A |

FOREIGN PATENT DOCUMENTS

| | | |
|---|---|---|
| 0 323 914 | 7/1989 | European Pat. Off. . |
| 8-88917 | of 1996 | Japan . |
| 9-55278 | of 1997 | Japan . |
| 2 282 992 | 4/1995 | United Kingdom . |
| WO 92/00616 | of 1992 | WIPO . |

*Primary Examiner*—Kristine Kincaid
*Assistant Examiner*—Chau N. Nguyen
*Attorney, Agent, or Firm*—Anthony J. Casella; Gerald E. Hespos; Michael J. Porco

[57] ABSTRACT

A watertight construction is provided at ends of wires where a core convergent splice portion is formed. The construction includes a plurality of wires w which are tightened by taping or by a band at locations on the insulation coatings of the wires and near exposed cores 1 where a core convergent splice portion 1A is formed. An adhesive is caused to penetrate into and solidify in clearances between the cores 1 and the wires w in a portion between the core convergent splice portion 1A and the tightened portion where the clearances are narrowed, thereby adhering the cores 1 to each other and the wires w to each other. A heat-shrinkable tube 6 having a hot-melt layer 6a formed on its inner surface is mounted on the ends of the wires w, and clearances S3 between the insulation coatings 2 of the wires w and the tube 6 are filled by the melted and solidified hot-melt layer 6a.

9 Claims, 7 Drawing Sheets

WATERTIGHT CONSTRUCTION FOR ENDS OF WIRES AND METHOD FOR FORMING THE WATERTIGHT CONSTRUCTION

BACKGROUND OF THE INVENTION

1. Field of the Invention

The present invention relates to a watertight construction for ends of wires where a core convergent splice portion is formed. The invention also relates to a method for forming the watertight construction. The invention is particularly designed to prevent water from penetrating through clearances between wires.

2. Description of the Related Art

A prior art wiring harness for an automotive vehicle or the like includes wires with cores that are connected to form a splice portion for the branch connection of circuits. The prior art includes a method according to which cores at the ends of the wires are exposed, collected and connected to form an end convergent splice portion. This prior art method has been adopted widely in recent years because it has few operation steps and is efficient.

The end convergent splice portion needs to be watertight and insulated securely from the outside. A variety of proposals have been made to realize such watertightness and insulation.

For example, Japanese Unexamined Patent Publication No. 9-55278 discloses a method according to which cores are exposed at ends of a plurality of wires and then are connected to form a convergent splice portion. Ends of the wires in proximity to the splice are immersed in a cyanogen or cyanoacrylate adhesive of low viscosity (30 cp or lower) which is commercially available and which generally is called "instantaneous adhesive". This method step causes the adhesive to penetrate into clearances between the cores and between the wires. The ends of the plurality of wires then are covered by a protection tube made of a synthetic resin.

According to the above described prior art method, the adhesive penetrates into the clearances between the cores at the ends of the plurality of wires and solidifies while covering the respective wires. Thus portions of the cores that were exposed by removal of the insulation coatings are completely covered by the adhesive. Even if water should enter the protection tube made of the synthetic resin from the outside, the adhesive-covered cores are not likely to rust. Further, the low viscosity adhesive that penetrated into the clearances between the cores also enters the insulation coatings by capillary action and solidifies therein. Consequently, any moisture that has entered the protection tube does not enter the insulation coating, thereby achieving some degree of watertightness.

Figure 8:
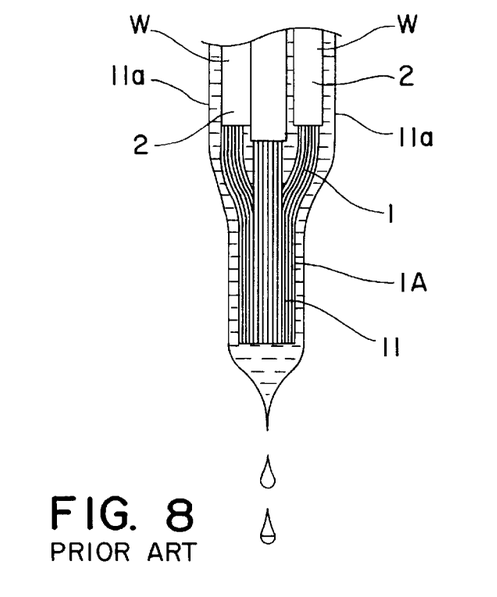
FIG. 8 is a side view of wire ends after the immersion in an adhesive, showing a problem of a prior art.
Figure 9A:
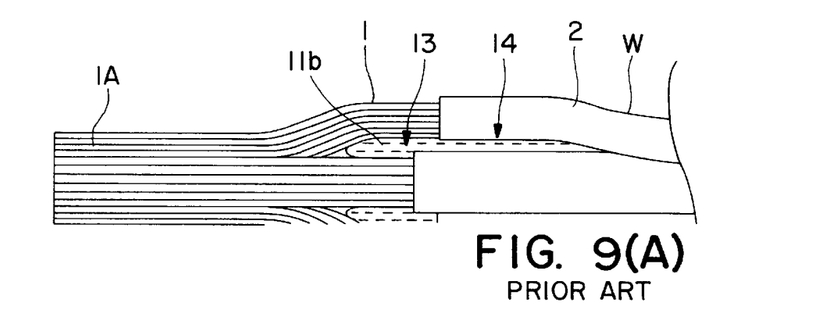
FIG. 9(A) shows unsolidified adhesive pools formed between cores in vicinity of ends of insulation coatings and FIG. 9(B) shows an unsolidified adhesive pool formed between the insulation coatings of the wires.
Figure 9B:
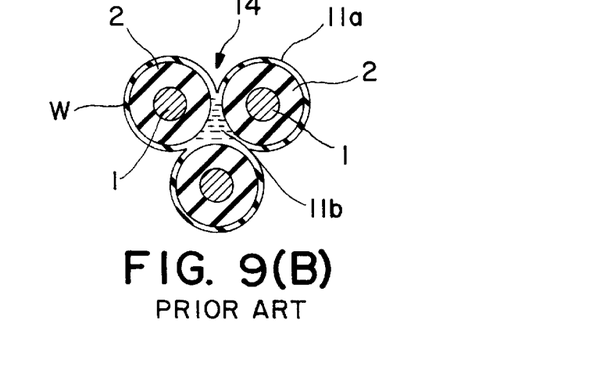

However, the watertight construction formed according to the above described prior art method could not realize reproducible and acceptably secure watertightness. Specifically, this prior art method assumes that, when the ends of the plurality of wires where the core convergent splice portion is formed are immersed in the cyanoacrylate adhesive, a relatively large amount of adhesive deposits on the outer surface of the insulation coatings of the wires. Furthermore, this prior art method assumes that the protection tube can be mounted easily on the wire ends in this state because the relatively large amount of adhesive acts as a lubricant. In reality, however, these assumptions are not accurate. In particular, with reference to FIG. 8, the prior art process includes immersing the wire ends in adhesive 11 of such a low viscosity that the adhesive 11 penetrates into the clearances between cores 1 by capillary action. If the wires w then are removed from the adhesive, the adhesive 11 runs down the outer surfaces of wires w to a convergent splice portion 1A of the cores 1 at the bottom end. The adhesive 11 then drips as shown in FIG. 8. A thin adhesive layer 11a remains on the outer surfaces of the insulation coatings 2 of the wires w, and instantaneously solidifies upon efficiently absorbing moisture in the air because the adhesive has a low viscosity and the insulation coatings 2 of the wires normally are made of vinyl chloride which has a poor adhesiveness to the cyanoacrylate adhesive. On the other hand, relatively large clearances 13 are formed between the cores 1a in proximity to ends 2a of the insulation coatings 2. Relatively large clearances 14 also are formed between the insulation coatings 2, since the wires are loose in a position distanced from the convergent splice portion 1A of the wires w. As a result, adhesive pools 11b are formed in these relatively large clearances as shown in FIGS. 9(A) and 9(B). Cyanoacrylate adhesives (instantaneous adhesives) solidify upon absorbing a moisture. Accordingly, if an adhesive pool (droplet) is formed, it does not solidify, even if left for a long time, because the moisture is not absorbed by the inner part of the adhesive pool.

Figure 10:
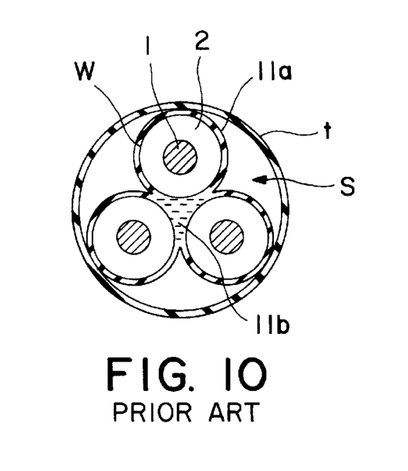
FIG. 10 is a diagram showing clearances formed between the insulation coatings of the wires and a protection tube to describe the problem of the first prior art.

Thus, according to the prior art, the thin layer of the adhesive 11 solidifies on the outer surfaces of the insulation coatings 2 of the wires w before the protection tube is mounted. The protection tube then is mounted with the adhesive pools 11b formed between the cores 1 in proximity to the ends 2a of the insulation coatings 2 and between the insulation coatings 2. Accordingly, clearances s are formed between the thin layers of the adhesive 11a formed on the outer surface of the insulation coatings 2 of the wires w and the inner surface of the protection tube t as shown in FIG. 10. Additionally the unsolidified adhesive pools 11b exist between the cores 1 in proximity to the ends 2a of the insulation coating 2 and between the insulation coatings 2 of the wires w (see FIG. 9). Therefore, water or moisture may enter the protection tube t through the clearances s between the protection tube t and the wires w. The water or moisture may then enter the clearances 14 between the insulation coatings 2 of the wires w and the clearances 13 between the cores 1. As a result, the entrance of water or moisture cannot be prevented securely by the prior art method.

Figure 11:
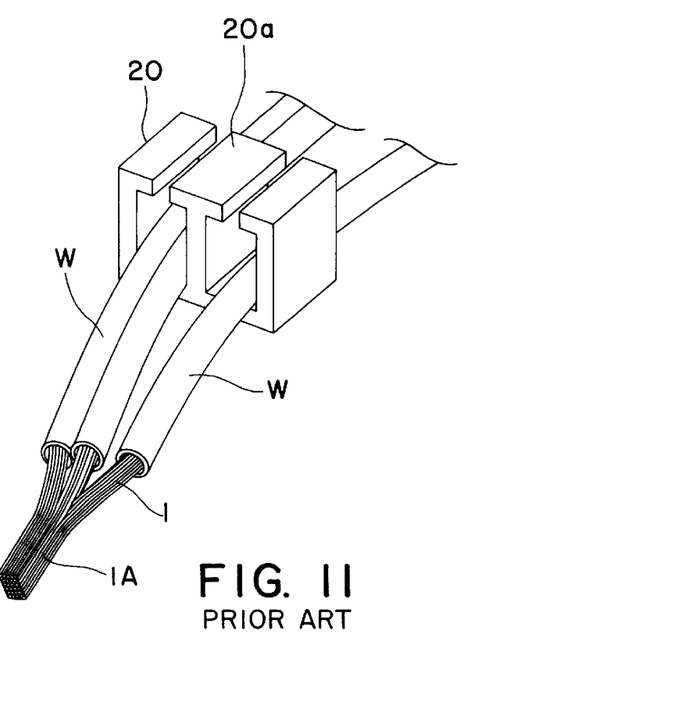
FIGS. 11 and 12 are diagrams showing a process of forming a watertight treated portion of wire ends according to a second prior art.
Figure 12:
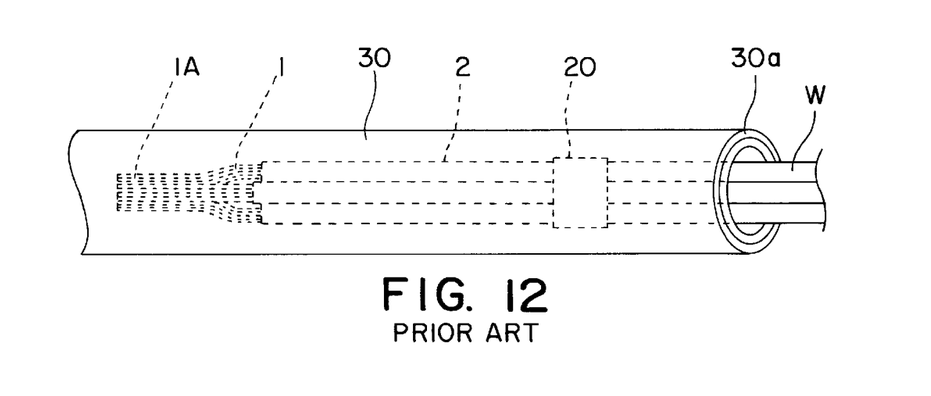
Figure 13:
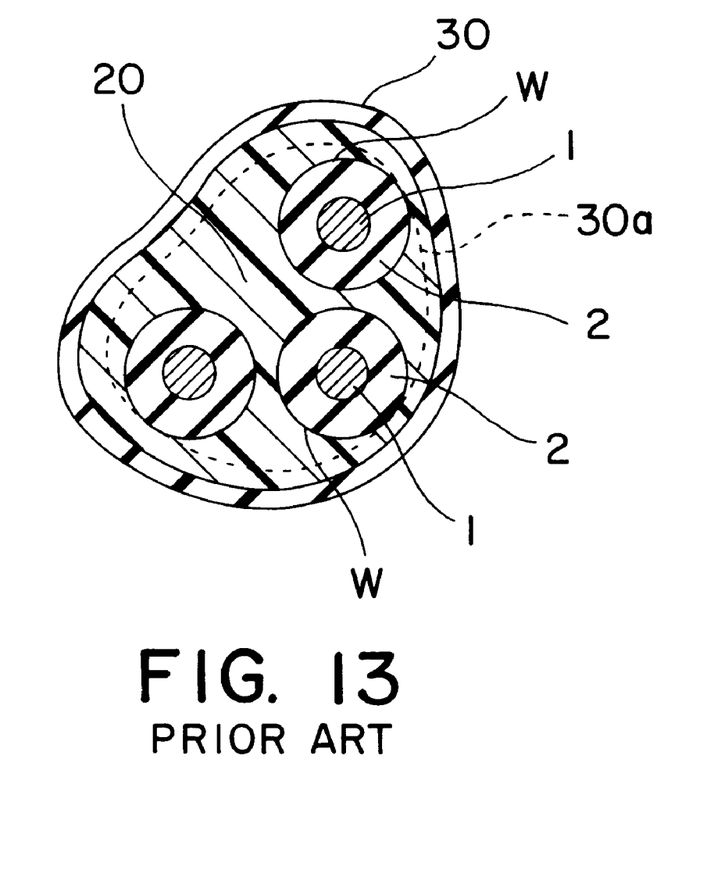
FIG. 13 is a horizontal section of the watertight treated portion of the second prior art.

In view of the above, the prior art has taken measures to completely fill with solidified resin the clearances between the outer surfaces of the wires and the inner surface of the protection tube, as well as the clearances between the insulation coatings of the wires. As shown in FIG. 11, a plurality of wires w forming a core convergent splice portion 1A at their ends are separated at the opposite sides of a partition plate 20a of a wire retaining block 20. The prior art block 20 is manufactured by Kabushiki Kaisha Raychem and sold under the product name RayBlock. The block 20 is made of a thermoplastic resin and has an E-shaped cross section. The shape shown in FIG. 11 enables the block 20 to be mounted in specified positions on the insulation coatings 2. After the wire ends are immersed in an adhesive and pulled up therefrom, a heat-shrinkable tube 30 having a hot-melt layer 30a on its inner surface is mounted to cover the wire retaining block 20 (see FIG. 12). The block 20 and the hot-melt layer 30a then are melted by applying heat. The melted thermoplastic resin of the block 20 and the hot melt layer 30a fills the clearances between the outer surfaces of the wires w and the protection tube 30, as well as the clearances between the insulation coatings 2 of the wires w (see FIG. 13). The melted thermoplastic resin then is permitted to solidify in these clearances. According to this method, the melted block 20 penetrates into the clearances between the insulation coatings 2 of the wires w and solidifies there, whereas the melted hot-melt layer 30a penetrates into the clearances between the insulation coatings 2 of the outermost wires w and the inner surface of the protection tube 30 and solidifies there. In this way, the aforementioned problem of the prior art method disclosed in the Japanese Unexamined Patent Publication No. 9-55278 can be solved. However, the prior art method of FIGS. 11–13 has its own problems in that the wire retaining block 20 made of the thermoplastic resin is expensive and that work efficiency is poor because of extra operations of separating the wires in the wire retaining block and mounting the heat-shrinkable tube on the wires so as to cover the block.

The present invention was developed to solve the above problems, and an object thereof is to provide a watertight construction which can securely protect ends of wires where a core convergent splice portion is formed and can inexpensively be formed by a simple operation.

SUMMARY OF THE INVENTION

According to the invention, there is provided a watertight construction for ends of wires where a core convergent splice portion is formed. In this construction, a plurality of wires are tightened by a tightener at the insulation coatings thereof and in the vicinity of or adjacent to exposed cores at the ends of the wires where the core convergent splice portion is formed. This tightening is effective for narrowing clearances between the wires. An adhesive then is caused to substantially penetrate and substantially solidify in clearances between the cores and/or in clearances between the wires in at least a part of a region between the core convergent splice portion and the tightened portion. The adhesive substantially adheres the cores to each other and/or the wires to each other.

A heat-shrinkable tube then is mounted on the ends of the plurality of wires. According to a preferred embodiment, the heat-shrinkable tube has a hot-melt layer on at least a part of its inner surface. The hot-melt layer is melted and solidified so as to substantially fill clearances between the insulation coatings of the wires and the heat-shrinkable tube.

According to a further preferred embodiment, there is provided a watertight construction for ends of wires where a core convergent splice portion is formed. In this construction, a plurality of wires are tightened by taping or by applying a band at the insulation coatings thereof in proximity to exposed cores at the ends of the wires where the core convergent splice portion is formed. The tightening narrows clearances between the wires. A cyanoacrylate adhesive then is caused to penetrate into and solidify in clearances between the cores and in clearances between the wires in a portion between the core convergent splice portion and the tightened portion. The adhesive adheres the cores to each other and adheres the wires to each other. A heat-shrinkable tube having a hot-melt layer on its inner surface is mounted on the ends of the plurality of wires. The hot-melt layer is melted and solidified so as to fill clearances between the insulation coatings of the wires and the tube.

Accordingly, the cyanoacrylate adhesive substantially penetrates into the clearances between the cores and substantially enters the inside of the insulation coatings by capillary action. The cyanoacrylate adhesive solidifies without leaving any unsolidified portion. The plurality of wires are tightened by taping or by applying a band at the insulation coatings thereof in proximity to the exposed cores to narrow the clearances between the wires and the adhesive that was caused to penetrate into and solidify in the narrowed clearances. Accordingly, the adhesive also penetrates into the clearances between the wires by capillary action, thereby spreading in the form of a thin layer over the outer surfaces of the insulation coatings of the respective wires and solidifying without leaving any unsolidified portion. On the other hand, the melted hot-melt layer penetrates into the clearances between the insulation coatings of the wires in the vicinity of the exposed cores and the inner surface of the heat-shrinkable tube or protection tube and solidifies therein. Accordingly, moisture trying to enter the end of the core convergent splice portion through the clearances between the cores from ends of the wires which are not treated to be watertight and opposite from the core convergent splice portion is blocked by the adhesive penetrated into and solidified inside the wires (insulation coatings). Moisture trying to enter the end of the core convergent splice portion through the clearances between the plurality of wires (between the insulation coatings) is blocked by the adhesive penetrated into and solidified in the clearances between the wires (between the insulation coatings). Further, moisture trying to enter the end of the core convergent splice portion through the clearances between the wires and the tube is blocked by the hot-melt layer penetrated into and solidified in these clearances between the insulation coatings and the tube. Therefore, the cores at the ends of the wires where the core convergent splice portion is formed are securely protected from external moisture, thereby realizing a secure watertightness.

The heat-shrinkable tube having the hot-melt layer on its inner surface normally is formed such that the hot-melt layer made e.g. of a thermoplastic resin is applied to the inner surface of a tube main body made of a polyolefin or polyvinyl chloride material. Further, the hot-melt layer of the heat-shrinkable tube preferably is made of a polyamide material. This is because the polyamide material has a satisfactory adhesiveness to vinyl chloride resins usually used as the insulation coatings of the wires. Thus, the insulation coatings and the tube are adhered more strongly, with the result that more reliable watertightness can be obtained.

Preferably, the adhesive is a cyanoacrylate adhesive. Accordingly, a very good sealing against the entrance of moisture can be provided.

Further preferably, the tightener comprises a taping, a band, a clamp and/or a fastening strap. Accordingly, the tightening can be performed effectively and at a lost cost.

Still further preferably, the heat-shrinkable tube is arranged at least partly overlapping with the tightener. Accordingly, the sealing function of the heat-shrinkable tube and the overall sealing of the watertight construction is enhanced.

Most preferably, the tightener is arranged at a position between about 3 and 5 cm, preferably at about 4 cm from the core convergent splice portion.

According to the invention, there is further provided a method for forming a watertight construction for ends of wires where a core convergent splice portion is formed. The method comprises convergently connecting cores exposed at ends of a plurality of wires to form a core convergent splice portion, and then tightening the plurality of wires by a tightener at the insulation coatings thereof in vicinity of the exposed cores to narrow clearances between the wires. The method continues by substantially adhering the exposed cores to each other and adhering the wires to each other by means of an adhesive, preferably a cyanoacrylate adhesive. This step is carried out to cause the adhesive to substantially penetrate into clearances between the cores and/or into clearances between the wires by capillary action and/or a pressure. The method proceeds by mounting a heat-shrinkable tube on the exposed cores and the insulation coatings of the plurality of wires, and applying heat to the heat-shrinkable tube to adhere it to the wires.

According to a preferred embodiment, the adhering step comprises the step of immersing the exposed cores of the wires and the insulation coatings of the wires in vicinity of the exposed cores in the adhesive, preferably the cyanoacrylate adhesive and then pulling up the cores and the insulation coatings from the adhesive, preferably the cyanoacrylate adhesive.

The heat-shrinkable tube preferably has a hot-melt layer on at least part of its inner surface, and the mounting step preferably comprises the step of heating the heat-shrinkable tube to fill clearances between the insulation coatings of the wires and the heat-shrinkable tube with the hot-melt layer melted by the heat. The method then continues by solidifying the hot-melt layer that had been melted and filled into the clearances.

According to a further embodiment of the invention, there is provided a method for forming a watertight construction for ends of wires where a core convergent splice portion is formed. The method comprises convergently connecting cores exposed at ends of a plurality of wires to form a core convergent splice portion and then tightening the plurality of wires by taping or by applying a band at the insulation coatings thereof in proximity to the exposed cores to narrow clearances between the wires. The method continues by adhering the exposed cores to each other and the wires to each other by immersing the exposed cores of the wires and the insulation coatings of the wires in vicinity of the exposed cores in a cyanoacrylate adhesive. This step is carried out to cause the cyanoacrylate adhesive to penetrate into clearances between the cores and into clearances between the wires by capillary action. The cores and the insulation coatings then are removed from the cyanoacrylate adhesive. The method then includes mounting a heat-shrinkable tube having a hot-melt layer on its inner surface on the exposed cores and on the insulation coatings of the plurality of wires. The method proceeds by applying heating to the heat-shrinkable tube to fill clearances between the insulation coatings of the wires and the heat-shrinkable tube with the hot-melt layer melted by the heat, and solidifying the filled melted hot-melt layer in the clearances.

If the above method is adopted, the watertight construction can be formed within a short time by a simple operation comprised of the formation of the core convergent splice portion, the tightening of the plurality of wires by taping or a band, the immersion of the wire ends in the adhesive, and the mounting and heating of the heat-shrinkable tube.

The clearances between the wires preferably are narrowed by taping in view of production costs and operability. If the wires are tightened by a band, and if a fastening band for a band clamp is used, it is not necessary to prepare a separate band only for narrowing the clearances between the wires. Accordingly, the number of parts can be reduced.

Further, the cyanoacrylate adhesive normally may have a viscosity of 1000 cp (centipoise) or lower, preferably 100 cp (centipoise) or lower, most preferably 10 cp (centipoise) or lower. This is because the lower the viscosity of the cyanoacrylate adhesive, the more smoothly the penetration of the adhesive into the clearances between the wires (between the insulation coatings) by capillary action occurs. This further improves the ability of the watertight construction to block moisture or water.

These and other objects, features and advantages of the present invention will become more apparent upon a reading of the following detailed description and accompanying drawings.

BRIEF DESCRIPTION OF THE DRAWINGS

FIGS. 4(A) to 4(D) show a process of forming the watertight treated portion of FIG. 1, wherein

FIGS. 9(A) and 9(B) are diagrams showing a problem residing in a first prior art, wherein

DETAILED DESCRIPTION OF THE PREFERRED EMBODIMENTS

A watertight treated portion of wire ends is identified by the numeral 100 in FIGS. 1–5. The watertight treated portion 100 includes a plurality of wires w that have cores 1 exposed from insulation coatings 2. Leading ends of the exposed cores 1 are convergently connected by resistance welding, soldering, conductive adhesive or like means to form a core convergent splice portion 1A. A portion of the convergent splice 1A has adjacent or neighboring cores 1 exposed and positioned partially in contact with each other. Thus a portion of the exposed cores 1 adjacent to the insulation coating 2 converge to each other due to their smaller diameter with respect to the insulation coating 2. An adhesive tape T is wound around the respective wires w in specified positions of the insulation coatings 2 in proximity to the exposed cores 1, and preferably positions distanced about 4 cm from the core convergent splice portion 1A in this embodiment. Thus the tape T narrows clearances between the insulation coatings 2 of the wires w at least between ends 2a of the insulation coatings 2 and the wound adhesive tape T. Alternatively, or in addition to the tape T, a clamp, a fastening strap or band or other such tightener may be used (not shown) to substantially bundle the wires w.

Figure 2A:
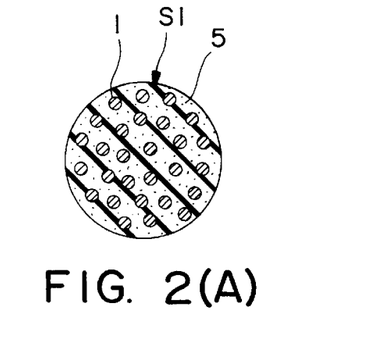
FIGS. 2(A) and 2(B) are horizontal and vertical sections showing a watertight state between cores of a plurality of wires in the watertight treated portion of FIG. 1.
Figure 2B:
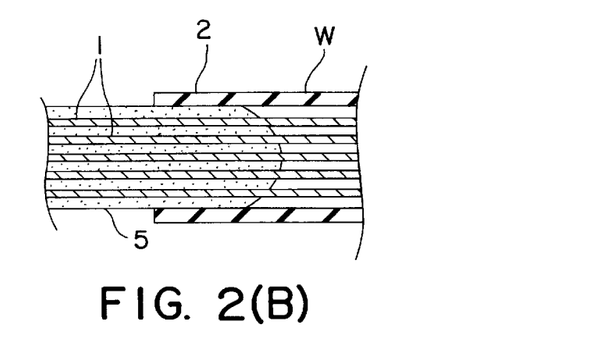

An adhesive, preferably a cyanoacrylate adhesive 5, substantially penetrates into and substantially solidifies in clearances S1 between the cores 1 exposed from the insulation coatings 2 of the wires w from a position before the core convergent splice portion 1A of the cores 1 to a position inside the insulation coatings 2, thereby adhering the cores 1 to each other (see FIGS. 2(A), 2(B)). Pools 4 of the unsolidified adhesive, preferably cyanoacrylate adhesive, are formed in clearances 3 between the cores 1 of the adjacent wires w in a portion between the core convergent splice portion 1A and the ends 2a of the insulation coatings 2 (see FIG. 2(C)) or areas in proximity to the ends 2a of the insulation coatings 2.

The winding of the adhesive tape T narrows clearances S2 between the wires w at locations between the ends 2a of the insulation coatings 2 and the adhesive tape T. The cyanoacrylate adhesive 5 penetrates into the clearances S2 and solidifies there to adhere the wires w to each other (FIG. 3(A)). A heat-shrinkable tube 6 comprised of a tube main body made of a radiation cross-linking polyolefin and a hot-melt layer 6a made preferably of a polyamide and formed on the inner surface of the tube main body is mounted over substantially the entire watertight treated portion 100 of the wire ends. Clearances S3 between the tube 6 and the insulation coatings 2 of the outermost wires w are filled or fillable at least partially with the melted and solidified hot-melt layer 6a (see FIG. 3(B)).

The watertight treated portion 100 of the wire ends is normally formed by the following sequence of process steps.

First, after the insulation coatings 2 at the ends of the wires w are removed to expose the respective cores 1, the wires w are put together to substantially align the leading ends thereof. The cores 1 of the wires w are connected substantially convergently e.g. by ultrasonic welding, soldering, gluing or other means while being closely put together. This forms the core convergent splice portion 1A (see FIG. 4(A)).

Figure 4A:
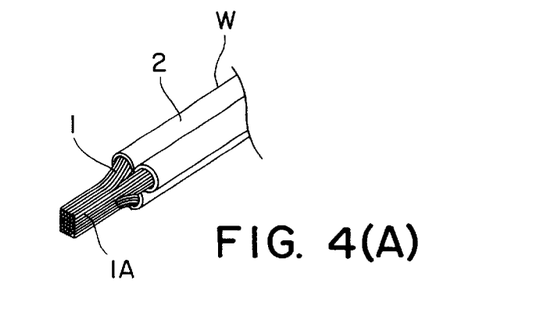
FIG. 4(A) is a perspective view showing a core convergent splice portion at the ends of the wires.
Figure 4B:
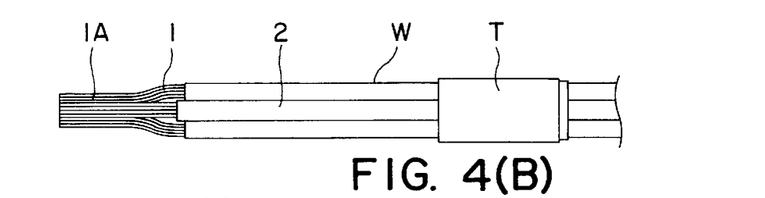
FIG. 4(B) is a side view of the wires bundled by taping.
Figure 5:
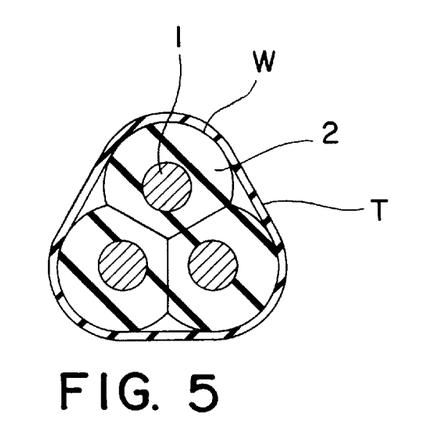
FIG. 5 is a horizontal section of the wires bundled by the taping step of FIG. 4(B).

Next, the adhesive tape T is wound tightly around the wires w in a position distanced preferably about 4 cm from the core convergent splice portion 1A (see FIG. 4(B)). The taping is sufficiently tight for the insulation coatings 2 of the adjacent wires w to be deformed and adhered substantially to or in close contact with each other as shown in FIG. 5. The taping is performed by inserting the plurality of wires w into a taping portion of a taping apparatus while holding the core convergent splice portion 1A and the insulation coatings 2 of the wires w in a specified position by hand.

The ends of the wires w where the core convergent splice portion 1A is formed are immersed in the cyanoacrylate adhesive (manufactured by Toagosei Chemical Industry Co. Ltd.) 5 of a viscosity preferably of 10 cp in a container 50 such that the insulation coatings 2 of the respective wires w also are immersed therein (FIG. 4(C)). Here, the cyanoacrylate adhesive 5, penetrates into the clearances between the wires w (between the insulation coatings 2), and between the cores 1 preferably by capillary action and/or by the action of a pressure applied thereto.

Figure 4C:
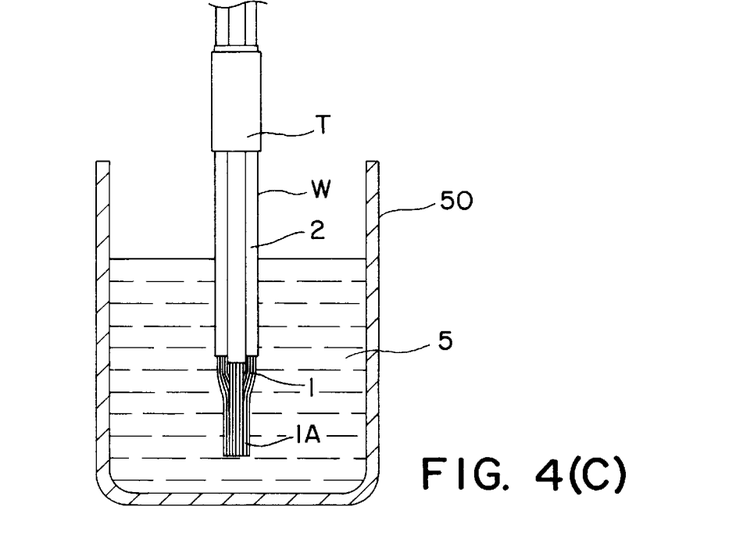
FIG. 4(C) is a side view showing a step of immersing the ends of the wires in an adhesive.

Next, the ends of the wires w are pulled up from the cyanoacrylate adhesive 5. The cyanoacrylate adhesive 5, substantially has penetrated into the clearances between the wires w (between the insulation coatings 2) and between the cores 1 and substantially solidifies. Thus the cores 1 adhere to each other and the wires w adhere to each other.

Figure 1:
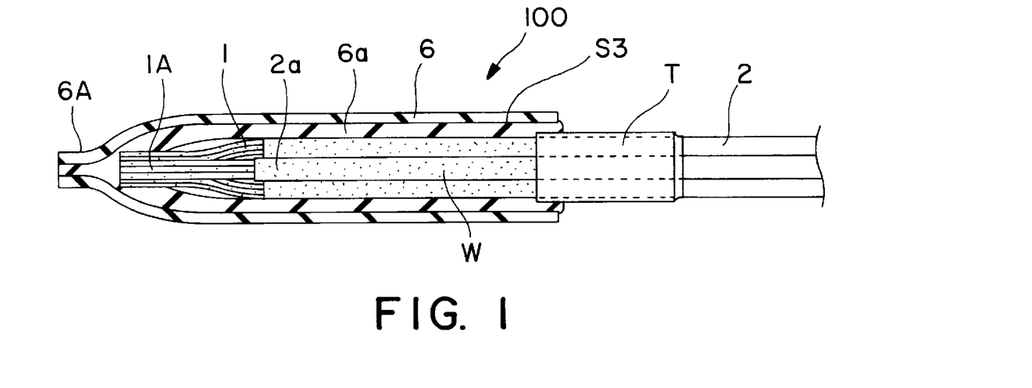
FIG. 1 is a vertical section of a watertight treated portion of wire ends according to a first embodiment of the invention.
Figure 2C:
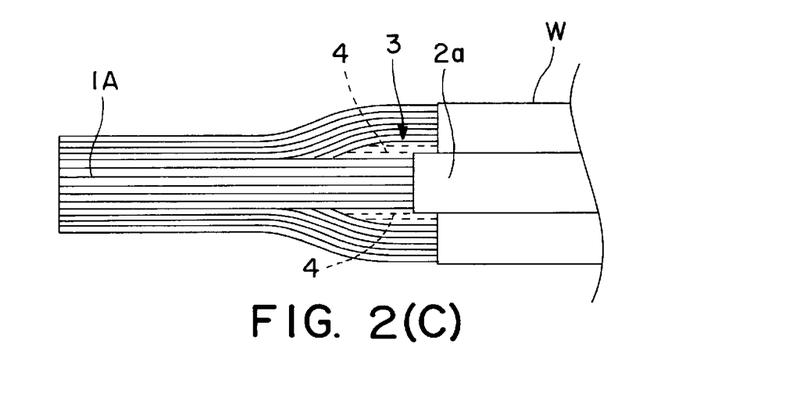
FIG. 2(C) is a diagram showing unsolidified adhesive pools between the cores of the watertight treated portion of FIG. 1.
Figure 3A:
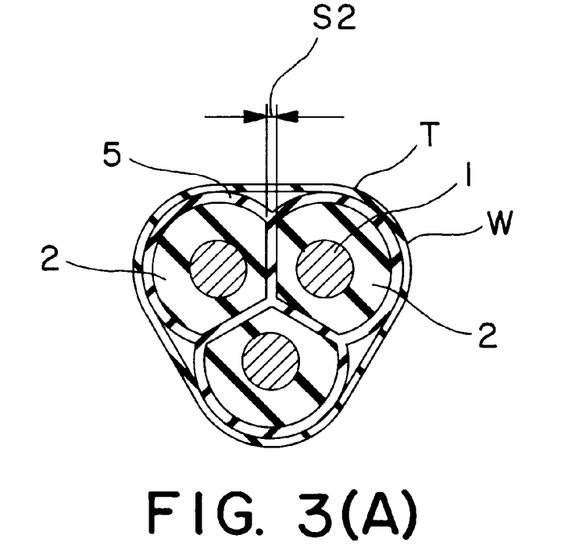
FIG. 3(A) is a horizontal section showing a watertight sate between insulation coatings of the wires of the watertight treated portion of FIG. 1
Figure 3B:
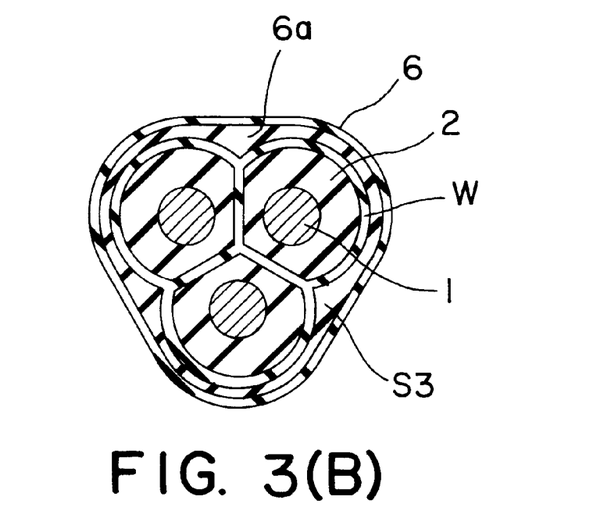
FIG. 3(B) is a horizontal section showing a watertight state between the insulation coatings of the wires and the inner surface of a heat-shrinkable tube in the watertight treated portion of FIG. 1.
Figure 4D:
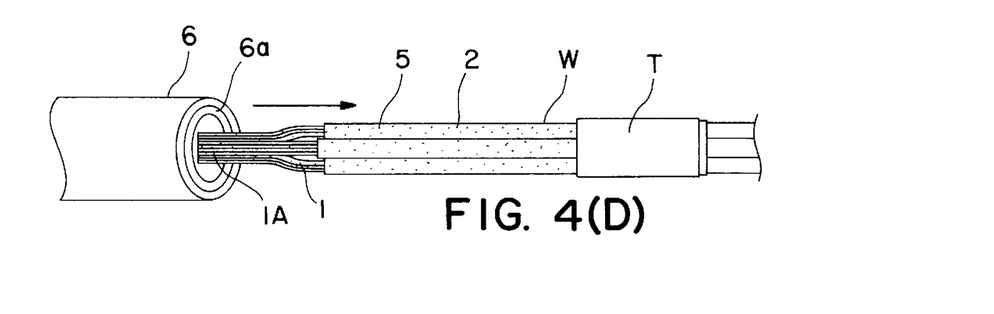
FIG. 4(D) is a side view showing a step of mounting the heat-shrinkable tube on the ends of the wires.

Next, the heat-shrinkable tube 6 (manufactured by Kabushiki Kaisha Raychem, Thermofit Tube ES2000) having the hot-melt layer 6a on its inner surface is mounted on the ends of the wires w as shown in (FIG. 4(D)) and is heated substantially entirely. As a result, a leading end 6A of the tube 6 is closed by the shrinkage of the tube wall and the solidification of the melted hot-melt layer 6a. Additionally, the melted hot-melt layer 6a is substantially filled between the cores 1 of the wires w and the inner surface of the tube 6 and between the insulation coatings 2 of the wires w and the inner surface of the tube 6. The melted hot melt layer 6a solidifies in these positions. In this way, the watertight treated portion 100 of the wire ends shown in FIGS. 1 to 3 is formed.

In the watertight treated portion 100 of the wire ends according to this embodiment, the cyanoacrylate adhesive 5 penetrates into the clearances S1 between the wires w from the exposed portions of the cores 1 to portions of the cores 1 inside the insulation coatings 2, as shown in FIGS. 2(A) and 2(B), and solidifies, thereby substantially adhering the cores 1 to each other. On the other hand, the cyanoacrylate adhesive 5 substantially penetrates into the clearances S2 between the wires (between the insulation coatings 2) and solidifies as shown in FIG. 3(A), thereby substantially adhering the wires w to each other along a portion that extends from the ends 2a of the insulation coatings 2 of the wires w to the position of the adhesive tape T. Further, as shown in FIG. 3(B), the clearances S3 between the insulation coatings 2 of the wire w and the inner surface of the heat-shrinkable tube 6 are substantially filled with the melted hot-melt layer 6a which has penetrated into the clearances S3 and substantially solidified therein. Accordingly, moisture trying to enter the core convergent splice portion 1A (exposed core portion) through the clearances between the respective wires w from an untreated end opposite from the watertight treated portion 100 is blocked inside the insulation coatings 2. Additionally moisture trying to enter the end of the core convergent splice portion 1A (exposed core portion) through the clearances S2 between the wires (between the insulation coatings 2) is blocked before the core convergent splice portion 1A. Further, moisture trying to enter the end of the core convergent splice portion 1A through the clearances between the insulation coatings 2 of the respective wires w and the heat-shrinkable tube 6 is blocked by the hot-melt layer 6a penetrated into the clearance S3 between the insulation coatings 2 and the tube 6 and solidified therein. Therefore, the watertight treated portion 100 of the wire ends where the core convergent splice portion 1A is formed has a watertight construction completely protected from moisture from the outside.

Further, the wire ends can easily be immersed in the adhesive, preferably cyanoacrylate adhesive, without loosening the wires w since the plurality of wires w are bundled by taping, clamping, gluing, fastening by means of a strap or band or like means. The prior art wire retaining block made of a thermoplastic resin for blocking the water between the wires is not used in the subject invention. Thus, it is not necessary to separate the wires and costs for materials can be reduced. As a result, a secure watertight construction can be formed more efficiently and inexpensively than before.

Figure 6:
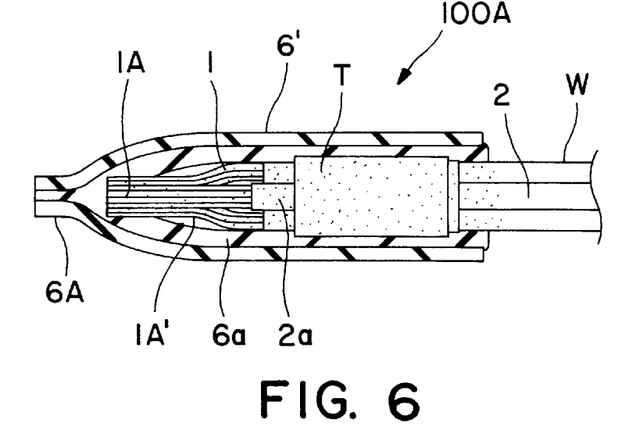
FIG. 6 is a vertical section of a watertight treated portion of wire ends according to a second embodiment of the invention.

FIG. 6 shows a watertight treated portion 100A of wire ends according to a second embodiment. An adhesive tape T is wound around ends 2A of insulation coatings 2 of a plurality of wires w in a position distanced from a rear end 1A' of a core convergent splice portion 1A that is less than the corresponding distance shown in FIG. 1 for the first embodiment. In this state, the ends of the wires w are immersed in a adhesive, preferably cyanoacrylate adhesive, and subsequently removed therefrom. Then, a short heat-shrinkable tube 6' (having a longitudinal length or extension smaller than that of the heat-shrinkable tube 6 according to the first embodiment) is mounted so as to at least partially, preferably substantially fully cover the adhesive tape T. Heating then is applied. In other words, the watertight treated portion 100A is made smaller by making the winding position of the adhesive tape T closer to the exposed cores 1 than the watertight treated portion 100 of the first embodiment and by using the short heat-shrinkable tube 6'. As a result, costs for materials (including the tube and the adhesive) are reduced. In this embodiment, since a spacing between the winding position of the adhesive tape T and a portion (core convergent splice portion 1A) of the treated portion 100A gripped by hand is narrow, an operability of taping is slightly lowered as compared with the first embodiment. A clamp, a fastening strap, band or like tighteners (not shown) may be used to bundle the wires w as an alternate to the tape T or in addition to the tape T.

Figure 7:
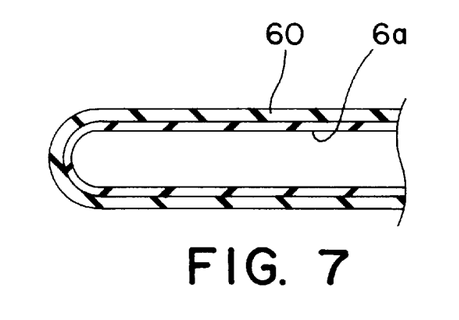
FIG. 7 is a vertical section of a heat-shrinkable tube used in a modification of the present invention.

In the foregoing embodiments, the tubes whose opposite ends are open are used as heat-shrinkable tubes and one end of the tube is closed after the tube is mounted on the wires. However, one end of the tube may be closed by heating before the tube is mounted on the wires. Alternatively, a heat-shrinkable tube 6A having one closed end as shown in FIG. 7 may be used.

Although the watertight construction for the ends of three wires is described in the foregoing embodiments, the present invention is also applicable to a watertight construction for the ends of two or four or more wires. In other words, even if four or more wires are bundled, instantaneous adhesive can substantially penetrate into clearances between the wires preferably by capillary action and by narrowing the clearances through taping or binding. Accordingly, the entrance of water or moisture can securely be prevented.

As is clear from the above description, according to the invention, the adhesive, preferably cyanoacrylate adhesive, penetrates into the clearances between the cores and between the insulation coatings of the wires preferably by capillary action. The adhesive then substantially solidifies therein at the ends of the plurality of wires. The melted hot-melt layer of the heat-shrinkable tube substantially penetrates into and substantially solidifies in the clearances between the insulation coatings of the wires and the inner surface of the protection or heat-shrinkable tube. Accordingly, there can be realized a watertight construction in which the ends of the plurality of wires are protected by the heat-shrinkable tube and which has a highly reliable watertightness to completely block the entrance of moisture from the outside.

What is claimed is:

1. A watertight wire splice construction comprising:

a plurality of wires, each said wire having a core and an insulation coating disposed over said core, portions of the insulation coating at an end of each said wire being removed for exposing portions of the core at the end of each said wire, the respective exposed portions of the cores of the wires being connected to one another to define a core convergent splice, a tightener wrapped around the insulation coatings of the wires in proximity to the exposed portions of the cores where the core convergent splice is formed for narrowing clearances between the wires, an instantaneous adhesive (5) being penetrated into clearances between the exposed portions of the cores and into clearances between portions of the wires which are between the core convergent splice and the tightener, the instantaneous adhesive being solidified for adhering the respective exposed portions of the cores to each other and for adhering portions of the insulation coatings between the core convergent splice and the tightener to each other, a heat-shrinkable tube being mounted over the exposed portions of the cores and over portions of the insulation coatings adjacent thereto, the heat-shrinkable tube having an inner surface with a hot-melt layer (6a) formed thereon, the hot-melt layer being melted to substantially fill clearances between the insulation coatings of the wires and the heat-shrinkable tube and then solidified.

2. A watertight construction according to claim 1, wherein the hot-melt layer of the heat-shrinkable tube is made of a polyamide material.

3. A watertight construction according to one claim 1, wherein the adhesive is a cyanoacrylate adhesive.

4. A watertight construction according to claim 1, wherein the heat-shrinkable tube at least partly overlaps the tightener.

5. A watertight construction according to claim 4, wherein the tightener is arranged between about 3 and 5 cm from the core convergent splice.

6. A method for forming a watertight wire splice, comprising the steps of:

providing a plurality of wires, each said wire having a core and an insulation coating over said core, removing the insulation coating at an end of each said wire to expose a portion of the core at the end of each said wire, convergently connecting the cores exposed at the ends of the wires to form a core convergent splice portion, applying a tightener around the insulation coatings in proximity to the exposed cores for narrowing clearances between the wires, immersing the exposed cores of the wires and portions of the insulation coatings of the wires in proximity to the exposed cores into an instantaneous adhesive, such that the instantaneous adhesive substantially penetrates into clearances between the cores and between the portions of the insulation coatings of the wires in proximity to the exposed cores by capillary action, removing the wires from the instantaneous adhesive such that the instantaneous adhesive solidifies and substantially adheres the exposed cores to each other and substantially adheres the portions of the insulation coatings of the wires in proximity to the exposed cores to each other, providing a heat shrinkable tube with an inner surface and a hot-melt layer on the inner surface, mounting the heat shrinkable tube over the exposed cores and the portions of the insulation coatings adjacent thereto, heating the heat-shrinkable tube to melt the hot-melt layer and to fill clearances between the insulation coatings and the heat-shrinkable tube with the hot-melt layer, and solidifying the hot-melt layer in the clearances.

7. A method according to claim 6, wherein the instantaneous adhesive is a cyanoacrylate and has a viscosity of no more than 1000 cp.

8. A method according to claim 7, wherein the adhesive has a viscosity of no more than 100 cp.

9. A method according to claim 8, wherein the adhesive has a viscosity of no more than 10 cp.

* * * * *